G. H. GIBSON.
METHOD OF AND APPARATUS FOR HEAT DETERMINATION.
APPLICATION FILED DEC. 1, 1916.

1,267,757.

Patented May 28, 1918.
3 SHEETS—SHEET 2.

Witness
Daniel Webster Jr.

Inventor
George H. Gibson
By Francis T. Chambers
his Attorney

UNITED STATES PATENT OFFICE.

GEORGE H. GIBSON, OF MONTCLAIR, NEW JERSEY.

METHOD OF AND APPARATUS FOR HEAT DETERMINATION.

1,267,757.　　　　　Specification of Letters Patent.　　Patented May 28, 1918.

Application filed December 1, 1916. Serial No. 134,287.

*To all whom it may concern:*

Be it known that I, GEORGE H. GIBSON, a citizen of the United States of America, and a resident of Montclair, county of Essex, State of New Jersey, have invented certain new and useful Improvements in Methods of and Apparatus for Heat Determination, of which the following is a true and exact description, reference being had to the accompanying drawings, which form a part thereof.

The primary object of my invention is to provide simple and effective methods of and apparatus for determining the amount of heat lost or absorbed by a fluid in flowing between two separated points in a conduit through which the fluid passes. In carrying out my invention, I create an electrical current modifying effect, which is proportional to the temperature difference between the separated conduit points and create a second electrical current modifying effect proportional to the quantity rate of fluid flow in the conduit and utilize these current modifying effects in combination to obtain an indication proportional to the product of said effect. The product thus obtained is proportional to the product of the amount of fluid flow through the conduit multiplied by the difference in temperature of the fluid at the separated points of the conduit, and is therefore proportional to the amount of heat lost or absorbed by the fluid in flowing between said points.

To create the electrical current modifying effect proportional to the difference between the temperature of the fluid between the separated points of the conduit, I pass an electrical current through resistance bodies which are subjected, one to the temperature of the fluid at one point and another to the temperature at the second of the conduit points between which the change in heat is to be determined, which vary in resistance as their temperatures change by increments in exact or approximate linear proportion to the change in temperature. The resistance bodies subjected to the different temperatures are suitably connected into an electric circuit or circuits, to create a current modifying effect therein proportional to the difference between the temperatures to which the bodies are subjected.

To obtain the second electrical current modifying effect, I employ a flow meter responsive to the quantity rate of fluid flow through the conduit and utilize this flow meter to actuate a suitable electrical current regulator, as required to obtain the desired current modifying effect.

The two electrical current modifying effects obtained in the manner just described may be utilized in combination to give an indication of the desired product in various ways. In one simple and effective form of carrying out my invention, I obtain the desired result by employing the flow meter and the current regulator actuated thereby to cause an electrical current proportional in strength to the quantity rate of fluid flow through the conduit to pass through the resistance bodies subjected to the temperatures at the separated points in the conduit. In this case, a comparison of the losses of potential in said resistance bodies gives the desired product, for the difference between the potential loss in one of the said resistances and the potential loss in the other of said resistance bodies will obviously be proportional to the product of the quantity rate of fluid flow through the conduit multiplied by the difference between the temperatures of the fluid at the two points at which the resistance bodies are located. The integrated difference between the losses in potential in the given resistances for a given period of time thus affords a direct measure for the amount of heat lost or absorbed by fluid passing between the two points of said conduit during said period of time.

In a second general mode of carrying out my invention, I utilize the resistance bodies to impress on an auxiliary resistance an electromotive force which is proportional to the difference in the temperatures to which the said resistance bodies are subjected. The auxiliary resistance on which the said electromotive force is impressed may be constant in amount, in which case I employ the flow meter to connect a portion of the said auxiliary resistance varying directly with the fluid rate of flow into a galvanometer circuit. Instead of impressing the said electromotive force on a constant auxiliary resistance, I may employ the flow meter to maintain said auxiliary resistance on which said electromotive force is impressed inversely proportional in amount to the fluid rate of flow through the conduit.

In other modes of carrying out my invention, I employ the resistance bodies to maintain in one electric circuit an electrical current flow proportional to the temperature change of the fluid, and employ the flow meter and current regulator actuated thereby to maintain a current flow in another circuit which varies in proportion to the quantity rate of fluid flow, and inductively measure the product of the currents flowing in two said circuits, by causing one current to flow through the field windings and the other through the armature conductors of an electrical motor meter which may be of the integrating watt meter type or may be an indicating or recording watt meter in which the torque of the movable meter element is resisted by a spring or other loading device.

The invention may be advantageously used for many purposes. For example, it is well adapted for determining the amount of heat furnished a user supplied with heat from a central station heating plant in which the circulating medium is hot water, and for measuring the refrigerating effect of a cooling fluid.

The various features of novelty which characterize my invention are pointed out with particularity in the claims annexed to and forming a part of this specification. For a better understanding of the invention, however, and the advantages possessed by it, reference should be had to the accompanying drawings and descriptive matter in which I have illustrated and described preferred forms of apparatus and methods embodying my invention.

Figures 1, 2:
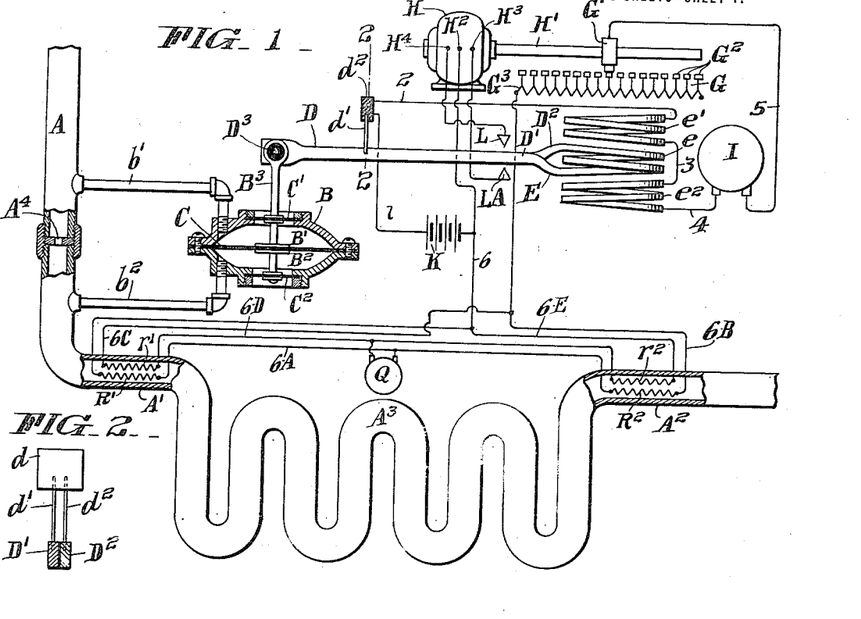
Figure 1 is a diagrammatic representation of one form of apparatus adapted for use in determining the heat loss or absorption of a fluid flowing through a conduit.
Fig. 2 is a partial sectional elevation taken on the line 2—2 of Fig. 1.

In the drawings, and referring first to the apparatus shown in Figs. 1 and 2, A represents a conduit through which a fluid flows, and $A'$ and $A^2$ represent points in said conduit at the opposite sides of a portion $A^3$ thereof in which the fluid loses or absorbs heat, the quantity of which it is desirable to determine. For example, the portion $A^3$ of the conduit A may correspond to the heat radiating coils and house piping of a user supplied with heat from a central station by means of a circulating medium in the form of hot water flowing through the conduit A.

The apparatus shown in Fig. 1 comprises means for automatically maintaining an electric current flow of a strength proportional to the quantity rate of flow through the conduit A. The means employed for this purpose comprise a differential pressure device B having its high and low pressure chambers $B'$ and $B^2$ respectively connected by pipes $b'$ and $b^2$ respectively to points in the conduit A between which a difference of pressure exists which is a function of the velocity head and hence of the rate of flow through the conduit. For example, as shown, the pipes $b'$ and $b^2$ are connected to the conduit A at the high and low pressure sides respectively, of a restricted orifice $A^4$ provided in the conduit. The differential pressure device B in the construction shown, has its chambers $B'$ and $B^2$ separated by a flexible diaphragm C. The diaphragm is connected at its center to a stem $B^3$ which is also connected to flexible diaphragms $C'$ and $C^2$. The latter are equal to one another in size but are smaller than the diaphragm C. The diaphragms $C'$ and $C^2$ close apertures in the walls of the chambers $B'$ and $B^2$ remote from the diaphragm C, and make stuffing box provisions for the stem $B^3$ unnecessary.

The stem $B^3$ is pivotally connected at its upper end to a lever D, to the opposite end of which is secured the movable coil $e$ of the electro-magnetic balancing device E. As shown, the lever D is formed by two metal bars $D'$ and $D^2$ insulated from each other, and forming the terminals of the coil $e$. The lever D is suspended from a fixed support $d$ by flexible conductors $d'$ and $d^2$ connected at their lower ends to the bars $D'$ and $D^2$ respectively. The knife-edge pivot $D^3$ carried by the lever D and the stem $B^3$ engaging the pivot $D^3$ are insulated from the bars $D'$ and $D^2$. The electro-magnetic balancing device E also comprises stationary coils $e'$ and $e^2$ coaxial with and located one above and the other below the coil $e$. When an electric current is caused to flow in series through the coils $e$, $e'$ and $e^2$ by the circuit connections hereinafter referred to, the coil $e$ is attracted by the coil $e^2$ and repelled by the coil $e'$.

The means shown for adjusting the electric current flow through the coils $e$, $e'$ and $e^2$ to impress the required variable balancing force on the lever D, comprises a rheostat G, a reversible electric motor H, and controlling provisions for operating the latter in one direction or the other in response to the movements of the lever D out of a neutral position. The rheostat G, as somewhat conventionally illustrated, comprises a contact member $G'$ movable along and engaging one or another of the stationary contacts $G^2$ connected at intervals to a resistance conductor $G^3$. As shown, the member $G'$ has a theaded passage receiving the threaded shaft $H'$ of the motor H. The motor H in the arrangement illustrated runs in one direction when a suitable source of electric current is connected to its terminals $H^2$ and $H^3$, and in the opposite direction when current is supplied to the motor terminals $H^2$ and $H^4$.

K represents an electric battery or other suitable source of electric current for the balancing device K and for the motor H. One terminal of the battery K is connected by the conductor $l$ to the flexible support $d'$ for the lever D and thereby to the bar $D'$ which forms one terminal of the floating coil $e$. The bar $D^2$ forming the other terminal of the coil $e$ is connected through the flexible conductor $d^2$ and the conductor 2 to one terminal of the stationary coil $e'$. The second terminal of the stationary coil $e'$ is connected by a conductor 3 to one terminal of the coil $e^2$. The second terminal of the coil $e^2$ is connected as shown, by a conductor 4 to one terminal of the ammeter I. The second terminal of the ammeter I is connected by the flexible conductor 5 to the movable element $G'$ of the rheostat G. The resistance conductor $G^3$ of the rheostat G is connected at one end to the second terminal of the source of current K by conductors 6 and 6B, and the multiple circuit connections between these conductors.

These multiple circuit connections comprise a resistance $R'$ located in the conduit A at the point $A'$, and having one terminal connected directly to the conductor 6 and its other terminal connected by the conductor 6A to one terminal of a resistance $R^2$ located in the conduit A at the point $A^2$ and having its second terminal connected directly to the conductor 6B. Also located in the conduit A at the point $A'$ is a resistance $r'$ having one terminal connected by the conductor 6C to the conductor 6B, and having its second terminal connected by the conductor 6D to one terminal of a second resistance $r^2$ located in the conduit A at the point $A^2$. The second terminal of the conductor $r^2$ is connected by a conductor 6E to the conductor 6. Between the conductors 6A and 6D is connected an instrument Q for measuring the difference in potential between the conductors 6A and 6D. This instrument Q may be a galvanometer, a potentiometer, or some other suitable type of sensitive volt meter, and in the practical use of my invention will ordinarily be a recording or integrating instrument.

Preferably the resistance bodies $R'$, $R^2$, $r'$ and $r^2$ are of equal resistance when at the same temperatures and each should be formed of a metal, or combination of metals such that a change in temperature of the body will result in a change in its electrical resistance which is approximately in linear proportion to the change in temperature through the range in temperature to which the body is subjected in carrying out the invention. For example, in using the invention as illustrated to measure the heat lost in a hot water heating system, the resistance bodies may be formed of pure copper.

In operation, the differential of the pressures in the chambers $B'$ and $B^2$ will be proportional to the square of the fluid rate of flow through the orifice $A^4$, and this pressure differential acting on one end of the lever D is balanced by the electro-magnetic interaction between the movable coil $e$ carried by the opposite end of the lever D and the stationary coils $e'$ and $e^2$. This electro-magnetic interaction exerts a force on the lever D which is proportional to the square of the current flowing in series through the coils $e$, $e'$ and $e^2$. As the pressure differential to which the diaphragm C is subjected increases, this moves the lever D into engagement with the contact L and causes the motor H to rotate in a direction to reduce the amount of the resistance conductor $G^3$ interposed between the conductors 6B and 5, and thus restore the balance. Similarly, on a diminution of the differential pressure on the diaphragm C, the lever D engages the contact LA and thereby causes the motor H to increase the amount of the resistance conductor $G^3$ interposed between the conductors 5 and 6B.

The apparatus shown in Fig. 1 operates automatically to maintain an electric current flow through the coils $e$, $e'$ and $e^2$ which is in linear proportion to the quantity of fluid flowing through the restricted orifice $A^4$.

Since the resistance bodies $R'$, $R^2$, $r'$ and $r^2$ all have the same resistance at the same temperature, and each varies in resistance in direct proportion to the variation in temperature to which it is subjected, one half of the balancing current of electricity flowing through the coils $e$, $e'$ and $e^2$ will pass through the resistance conductors $R'$ and $R^2$, and the other half will pass through the resistance conductors $r'$ and $r^2$. This division of the current into two equal parts will obviously be unaffected by the difference in the temperatures at the points $A'$ and $A^2$ since each of the two divided circuits includes two similar resistances subjected, one to the temperature at the point $A'$ and the other to the temperature at the point $A^2$. The potential losses in the resistances $R'$ and $r'$ will always be equal, and this is true also of the potential losses in $R^2$ and $r^2$, but the potential losses in the resistances $R'$ and $R^2$ will be different in case the temperatures at the points $A$ and $A^2$ are not the same.

Let $R_0$ represent the resistance of each of the resistance bodies $R'$, $R^2$, $r'$ and $r^2$ at zero centigrade, and let $a$ represent the increment of resistance increase for each degree of temperature increase, $T_1$ and $T_2$ the temperatures in the conduit $A$ at the points $A$ and $B$ respectively, and let $C$ represent the balancing current of electricity flowing through coils $e$, $e'$ and $e^2$.

With these assumptions, it will readily be seen that the potential difference to which the terminals of the instrument $Q$ are subjected is equal to $$\frac{C}{2}(R_0 + aT_1) - \frac{C}{2}(R_0 + aT_2) = KC(T_1 - T_2)$$

where $K$ is a constant and equal to $\frac{a}{2}$. In consequence, the instrument $Q$ measures a quantity proportional to the product of the amount of fluid flowing through the conduit multiplied by the change in temperature of the fluid as it passes through the conduit portion $A^3$. In other words, the instrument $Q$ shows the amount of heat lost or absorbed and may be calibrated to directly show the number of B. T. U.'s lost or gained.

Figure 3:
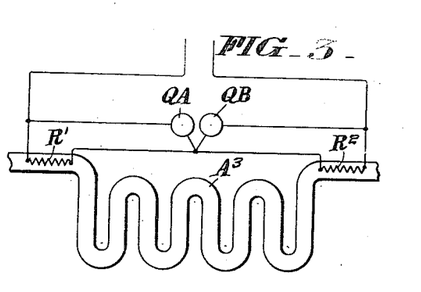
Fig. 3 is a diagrammatic representation of a portion of a modified form of apparatus.

In essence, the amount of heat lost or gained by a fluid in passing from one point to another of the conduit through which the fluid passes is determined, according to this mode of carrying out my invention, by a comparison of the potential drop in two resistances subjected to the temperatures at said conduit points when there is passed through such resistance an electrical current which is proportional in strength to the quantity rate of flow through the conduit. The apparatus and method which may be employed to carry out my invention in this general mode may differ greatly in form from those already disclosed in detail. For example, a very simple form of apparatus for effecting this comparison is illustrated in Fig. 3, wherein similar volt meters QA and QB have their terminals connected, one to the terminal of the resistance $R'$ and the other to the terminals of the resistance $R^2$, the resistances $R'$ and $R^2$ being connected to current regulating mechanism as in Fig. 1. In utilizing the apparatus shown in Fig. 3, it is necessary to take simultaneous readings of the instruments QA and QB.

Figure 4:
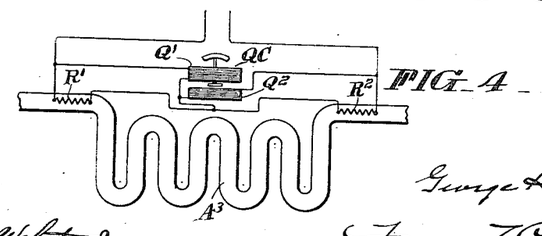
Fig. 4 is a view similar in character to Fig. 3, illustrating a different modification.

The disadvantage of taking simultaneous readings is avoided in the use of the apparatus shown in Fig. 4 which differs from that shown in Fig. 3 only in that the instruments QA and QB are replaced by a single differential volt meter QC having one of its coils $Q'$ connected to the terminals of the resistance $R'$ and the other coil $Q^2$ connected to the terminals of the resistance body $R^2$.

Figure 5:
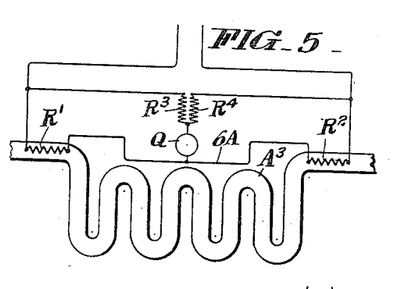
Fig. 5 is also a view similar to Fig. 3 and illustrating still another modified form of apparatus.

The apparatus shown in Fig. 5 differs from that shown in Fig. 3 in that a single instrument $Q$ is employed which has one terminal connected to the conductor 6A and the other terminal connected to the common terminal of two resistances $R^3$ and $R^4$ which are connected in series with one another and in shunt to the resistances $R'$, $R^2$ and the conductor 6A. The resistance bodies $R^3$ and $R^4$ are arranged in proximity to one another so as to be subjected to the same temperature, and these bodies should have an electrical resistance very large in comparison with the resistance of the resistance bodies $R'$ and $R^2$. In consequence, the relative resistances of the resistance bodies $R^3$ and $R^4$ will be unaffected by the temperatures to which they are subjected, and the current diverted away from the resistance bodies $R'$ and $R^2$ will be so small in comparison with the current flowing through $R'$ and $R^2$ that it will be without appreciable effect on the potential differences at the terminals of the resistance bodies $R'$ and $R^2$.

In the practical use of such apparatus, as is shown in Fig. 5, the resistance conductors $R^3$ and $R^4$ would really pertain to and form a part of the instrument $Q$, and the apparatus shown in Fig. 5 is thus a very simple and practical one.

While the apparatus disclosed in Figs. 1 to 5 and the described methods of operation in which this apparatus is employed are generically covered by the claims of this case, such apparatus and methods embody specific features of novelty which are not specifically claimed herein but are so claimed in my copending application, Serial No. 103,044 filed June 10, 1916.

Figure 6:
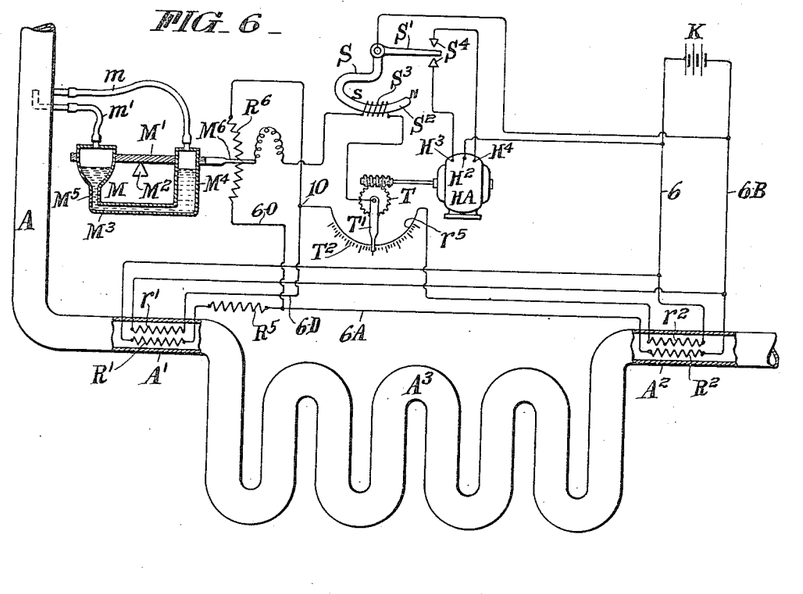
Fig. 6 is a diagrammatic representation of a form of apparatus of different type from those shown by the preceding figures.

In the apparatus shown in Fig. 6, resistance bodies $R'$ and $R^2$ and $r'$ and $r^2$ are located in the conduit $A$ and are connected with a source of current $K$, exactly as in Fig. 1, except that similar resistance bodies $R^5$ and $r^5$ are connected in the circuit conductors 6A and 6D respectively, externally of the conduit $A$. The resistance body $r^5$ is shown as forming the arc-shaped slide wire of a potentiometer, comprising a switch arm T' movable over and in electric contact with the resistance $r^5$, a worm wheel T carrying the arm T' and rotated in one direction or the other, as hereinafter explained, by means of a reversible motor HA, which may be similar in construction to the motor H previously described, and has its threaded spindle in mesh with the worm wheel T. The motor HA has its common terminal $H^2$ connected to the conductor 6 and has its terminals $H^3$ and $H^4$ connected to switch contacts $S^4$ on opposite sides of a switch arm S' which is connected to the conductor 6B and is carried by the oscillating element of a galvanometer S. The latter comprises an arc-shaped polarized armature $S^2$ surrounded by a coil $S^3$. The coil $S^3$ has one terminal connected to the switch arm T'. The second terminal of the coil S' is suitably connected to a contact member $M^6$, which is carried by an oscillating flow meter M, and is adapted to sweep over a resistance $R^6$ which is connected at one end to the conductor 6D and at the other end to the conductor 6A so that the current flow through the resistance $R^6$ varies (with any given value of the electromotive force of the source K) in proportion with the temperature difference between the points A' and $A^2$ of the conduit A. The flow meter M shown in Fig. 6, is of a known type, comprising a U-tube $M^3$ mounted in a carrier M', which is pivoted on the knife-edge fulcrum $M^2$. The U-tube is partially filled with mercury. One leg $M^4$ of the U-tube $M^3$ has its upper end connected by flexible conduit $m$ to the conduit A, so as to transmit the static pressure in the latter to the upper end of the column of mercury in leg $M^4$. Similarly, a flexible conduit $m'$ transmits the velocity pressure in the conduit A adjacent to the point to which the flexible conduit $m$ is connected to the upper end of the second leg $M^5$ of the U-tube.

With this type of meter, the fluid flow through the conduit A creates a difference in the pressure transmitted through the conduit $m$ and $m'$ to the legs of the U-tube, which is proportional to the square of the fluid rate of flow through the conduit. The difference in the pressures thus impressed on the upper ends of the columns of mercury in the legs of the U-tube produces a corresponding displacement of the mercury, thus shifting the center of gravity of the U-tube and turning the latter about its fulcrum point in a clockwise direction. The resistance $R^6$ is so arranged relative to the flow meter that in the no-flow condition through the conduit, the meter-carried contact $M^6$ will be at the terminal of the resistance $R^6$ connected to the conductor 6D and, at the maximum flow through the conduit A for which the apparatus is designed, the contact $M^6$ will engage the terminal of the resistance $R^6$ connected to the conductor 6A. At intermediate flows, the contact $M^6$ occupies such positions that portions of the resistance $R^6$ above the contact $M^6$ will bear the same ratio to the total resistance $R^6$ which said intermediate rate of flow bears to the maximum rate of flow for which the apparatus is designed. This result is obtained with the apparatus shown by a uniform distribution of the resistance $R^6$ along its length combined with a special shaping of the two legs of the U-tube, required to make the turning movements of the meter M directly proportional to the changes in the rate of flow through the conduit A which produce such turning movements. The mathematical formulæ governing the shaping of the U-tube legs to obtain this result are well known to those skilled in the art and need not be stated herein, as they form no part of the present invention.

A current flow through the coil $S^3$ moves the polarized armature $S^2$ in one direction or the other, according to direction of current flow through the coil $S^3$. The consequent movement of the switch arm S' into engagement with the one or the other of the switch contacts $S^4$ energizes the motor HA for operation in whichever of the two directions it should run to move the switch arm T' into the position in which there is no current flow through the coil $S^3$. The position of the switch arm T' in which there is no current flow through the coil $S^3$ is necessarily that in which the switch arm T' and contact $M^6$ are at the same potential. Since the resistances $r^5$ and $R^6$ are connected together at the point 10, the contacts $M^6$ and switch arm T' are at the same potential when the voltage drop through the portion of the resistance $R^6$ above the contact $M^6$ is equal to the voltage drop through the portion of the slide wire resistance $r^5$ to the left of the switch arm T'.

With no current flow through the coil $S^3$ of the galvanometer S the switch arm S occupies the neutral position shown in Fig. 6. With a current flow through the coil $S^3$ in one direction the switch arm S' will move upward from the neutral position, and with a current flow through the coil $S^3$ in the opposite direction the switch arm S' will move downward from the neutral position. The galvanometer S thus forms an electrical indicating device connected between the contacts $M^6$ and T'.

With the apparatus shown in Fig. 6, the amount of resistance of the portion of the slide wire resistance $r^5$ between the switch arm T' and the point 10 when there is no current flow through the coil $S^3$, is proportional to the product of the quantity rate of flow through the conduit A multiplied by the difference in temperatures between the points A' and $A^2$.

To understand this, assume that C equals the equal electric currents flowing at any instant through the conductors 6A and 6D and that, at the same instant, F represents the rate of fluid flow through the conduit A and $t$ the difference in temperatures between the points A′ and A², and that, at the same instant, $r^{50}$ is the ohmic measure of the resistance $r^5$ to the left of the switch arm T′. Assume, also, that F′ is a constant equal to the rate of flow through the conduit A which will cause the contact M⁶ to engage the lower terminal of the resistance R⁶ and that $a$, and $b$, are other suitable constants. With these assumptions, the difference in potential between the opposite ends of the resistance R⁶ will be equal to $aCt$, and the difference in potential between the upper end of the resistance R⁶ and the contact M⁶ will be equal to $$\frac{F}{F'}aCt.$$

At the same instant, the drop in potential in the portion of the resistance $r^5$ to the left of the switch arm T′ is equal to $Cr^{50}$.

Since $$\frac{F}{F'}aCt$$

is thus equal to $Cr^{50}$, it follows that $Ft$ is equal to $br^{50}$ or, in other words, the product of the rate of flow through conduit A multiplied by the change in temperature between the points A′ and A² is proportional to the ohmic resistance of the portion of the resistance $r^5$ to the left of the switch arm T′. It follows, therefore, that the numerical value of the desired product may be determined by means of scale marks T² along which the end of the switch arm T sweeps.

Figure 7:
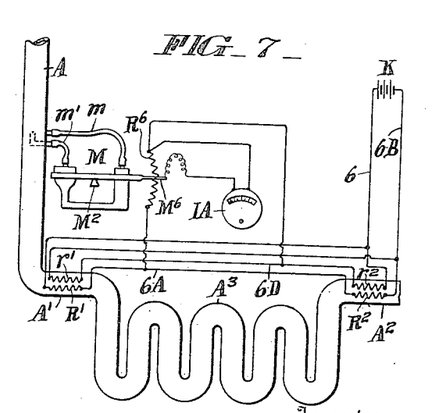
Fig. 7 is a diagrammatic representation of an apparatus generally similar to that shown in Fig. 6, but employing a simplification made possible where a source of constant electro-motive force is available.

The apparatus shown in Fig. 7 differs from that shown in Fig. 6 in the omission of the resistances R⁵ and $r^5$ and in the omission of the galvanometer S, potentiometer T and motor HA. In Fig. 7, a galvanometer IA has one of its terminals connected to the terminal of the resistance R⁶ away from which the switch contact M⁶ is moved by the flow meter M, as the flow through the conduit A increases, and the second terminal of the galvanometer IA is connected to the switch contact M⁶. With this arrangement, the current flow through the windings of the galvanometer IA will be proportional to the product of the quantity rate of fluid flow through the conduit A multiplied by the difference in temperature of the fluid at the points A′ and A² in the conduit, provided the source K of current K impresses a constant electromotive force on the conductors 6 and 6D. The apparatus shown in Fig. 7 while obviously simpler than that shown in Fig. 6, is less practical, because of the necessity for maintaining a constant potential difference between the supply conductors 6 and 6B in Fig. 8.

Figure 8:
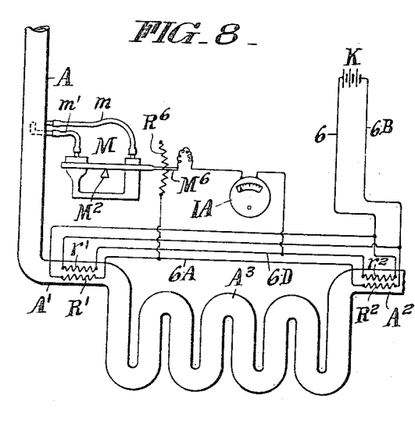
Fig. 8 is a diagrammatic representation illustrating a slight modification of the apparatus shown in Fig. 7.

The apparatus shown in Fig. 8 differs from that shown in Fig. 7 in that the upper terminal of the resistance R⁶ is not connected to the conductor 6D, while the switch contact M⁶ carried by the flow meter M is connected through the windings of the galvanometer IA to the conductor 6D. With this form of apparatus, it will be apparent that the portion of the resistance R⁶ below the contact M⁶ is the only portion of the resistance R⁶ in circuit, and the current flow through the galvanometer IA will be directly proportional to the product of the quantity of fluid flow through the conduit A multiplied by the difference in temperature of the conduit points A′ and A², if the source of current K is a source of constant electromotive force.

Figure 9:
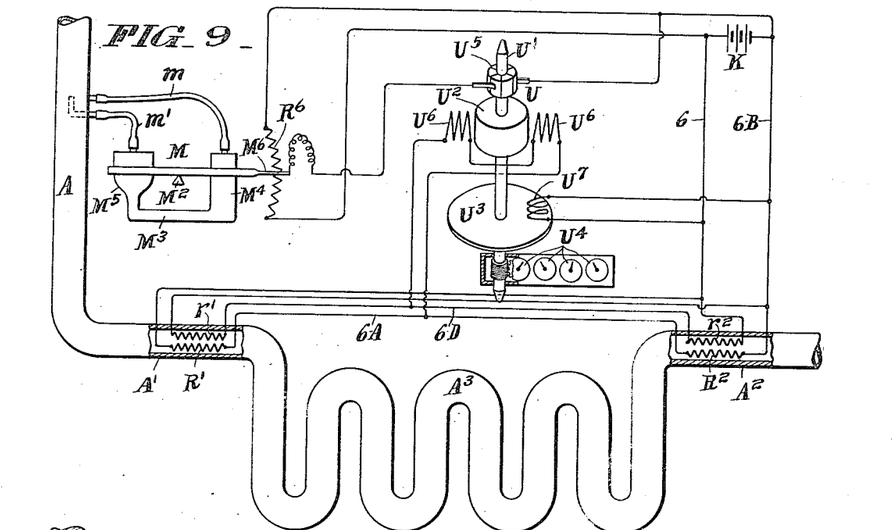
Fig. 9 is a diagrammatic representation of a form of apparatus in which an electrical motor meter is employed to inductively multiply the effect of one electric current by another.
Figure 10:
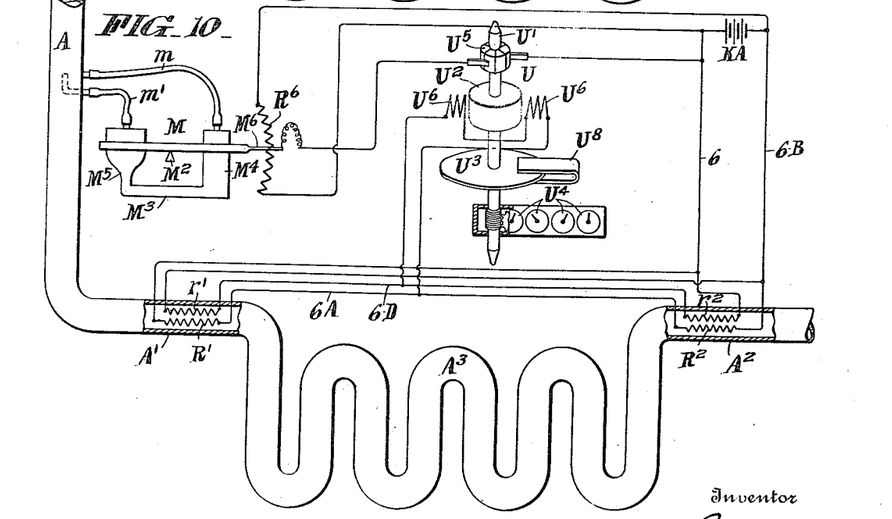
Fig. 10 is a view taken similarly to Fig. 9 and illustrating a simplification of the apparatus of Fig. 9 made possible by the use of a source of constant electro-motive force.

In the modified form of apparatus shown in Fig. 9 the resistances R′ and R², $r'$ and $r^2$ are connected to the source of current K, as in Fig. 1. The resistance R⁶ over which the flow meter of switch contact M⁶ sweeps, as in Fig. 6, has its terminals connected to the terminals of the current source K. In this form of apparatus, a motor meter U of the integrating watt meter type is employed. The armature windings U² of the motor meter have their terminals connected to the bars of the commutator U⁵. One of the commutator brushes is connected to the flow meter contact M⁶, and the other brush is connected to the conductor 6B. While the armature windings of the meter are thus connected in a shunt about the portion of the resistance R⁶ above the contact M⁶, the resistance of this shunt should and naturally would be so great relative to the ohmic value of the resistance R⁶ that the current flow through the shunt will not appreciably alter the potential drop in the portions of the resistance R⁶ above and below the contact M⁶. The field windings U⁶ of the meter are connected in series between the conductors 6A and 6D. The conducting drag disk U³ of the meter is inductively acted upon by a coil U⁷ which has its terminals connected, one to the conductor 6 and the other to the conductor 6B. With this arrangement, the current flowing through the field windings U⁶ of the motor meter will vary with the temperature difference between the points A′ and A² of the conduit A, and the current through the armature of the motor meter will be proportional to the quantity rate of fluid flow through the conduit. The meter U serves to inductively multiply the two currents passing through its armature and field windings, and the counting wheels U⁴ of the meter will thus give the integrated value of the heat lost or absorbed by the fluid flow through the conduit between the points A′ and $A^2$. The drag coil $U^7$ renders the meter indications independent of fluctuations in the voltage of the current supply source K. Where the current supply source K is replaced by a source KA of constant electromotive force, the drag coil $U^7$ may be replaced by the usual permanent magnet $U^8$ as shown in Fig. 10.

While in accordance with the provisions of the statutes, I have illustrated and described the best forms of apparatus and methods now known to me for accomplishing the object of my invention, it will be apparent to those skilled in the art that my invention may be embodied in apparatus and carried out by methods specifically different from those disclosed herein.

Having now described my invention, what I claim as new and desire to secure by Letters Patent, is:—

1. The method of determining the amount of heat lost or absorbed by fluid in flowing between separated points in a conduit, which consists in creating an electrical current modifying effect proportional to the temperature difference between said points, and in creating an electrical current modifying effect proportional to the quantity rate of fluid flow in said conduit, and utilizing said current modifying effects in combination to thereby obtain an indication proportional to the product of said effects.

2. The method of determining the amount of heat lost or absorbed by fluid in flowing between separated points in a conduit, which consists in creating an electrical current modifying effect proportional to the temperature difference between said points by means of electrical resistances subjected to the temperatures of the fluid at said points and varying in resistance with the temperatures to which they are subjected, and in creating an electrical current modifying effect proportional to the quantity rate of fluid flow in said conduit by means of a device responsive to said rate of flow and a current regulator actuated thereby and influencing an electrical indicating means jointly by the current modifying effects produced to thereby obtain an indication proportional to the product of said effects.

3. The combination with a conduit, of means for determining the amount of heat lost or absorbed by fluid in flowing between separated points in said conduit, comprising resistances subjected to the temperatures of the fluid at said points and varying in resistance with the temperatures to which they are subjected according to a pre-determined law, a flow meter responsive to the quantity rate of fluid flow through said conduit, a current regulator actuated by said device, and electrical indicating means operatively connected to said resistances and to said current regulator and jointly influenced thereby to indicate the product of said rate of flow and the difference in temperatures between said points.

4. The combination with a conduit, of means for determining the amount of heat lost or absorbed by fluid in flowing between separated points in said conduit, comprising means including parts subjected to the temperatures at said points and adapted to exert an electric current modifying effect proportional to the difference in temperature at said points, means responsive to the fluid rate of flow through said conduit, a current regulator actuated thereby and electrical exhibiting means operatively connected to the first mentioned means and to said current regulator and jointly influenced thereby to indicate the product of said rate of flow and the differences of temperature between said points.

5. Electrical resistance means for determining the difference in temperature at two points, comprising in combination a pair of similar resistances located at each of said points and each varying in the amount of its resistance with the temperature to which it is subjected, a source of current, circuit connections providing two parallel circuits supplied with current from said source and each including a resistance at each of said points, said connections being so arranged that the current flows between the two resistances located at each point and the resistances in series therewith respectively and located at the other conduit point, are in opposite directions, and a cross connection between said parallel circuits connected to each of the latter between the two resistances therein.

6. The combination with a conduit of means for determining the amount of heat lost or absorbed by fluid in flowing between separated points in said conduit, said means comprising a source of electro-motive force, parallel circuits connected to said source and including resistances subjected to the temperatures of the fluid at said points and varying in resistance with the temperatures to which they are subjected according to a predetermined law, an external resistance connected to said parallel circuits at points therein between which exists a potential difference due to the difference in the temperatures of said conduit points, a measuring instrument, means for including in circuit said measuring instrument a portion of said outside resistance varying proportionately with the quantity rate of fluid flow through said conduit.

7. The combination with a conduit, of means for determining the amount of heat lost or absorbed by fluid in flowing between separated points in said conduit, said means comprising a source of electro-motive force, parallel circuits connected to said source and including resistances subjected to the temperatures of the fluid at said points and varying in resistance with the temperatures to which they are subjected according to a predetermined law, an external resistance connected to said parallel circuits at points therein between which a potential difference exists due to the difference between the temperatures at said conduit points, an electrical indicating device, a flow meter responsive to the quantity rate of fluid flow through said conduit, and a contact actuated by said meter to include a portion of said external resistance in circuit with said indicating device varying proportionately with the quantity rate of fluid flow through said conduit.

8. Means for determining the amount of heat lost or absorbed by a fluid in flowing between two separated points in a conduit, comprising in combination a source of current, circuit connections providing two parallel circuits supplied with current from said source and each including a resistance at each of said points and an intermediate connecting portion, said connections being so arranged that the currents flow in opposite directions through said circuits between the resistances located at said separated points, a cross connection between the intermediate portions of said parallel circuits, a pair of movable contacts, one movable along said cross connection and the other along one of said intermediate circuit portions, and electrical indicating means connected between said contacts.

9. Means for determining the amount of heat lost or absorbed by a fluid in flowing between two separated points in a conduit, comprising in combination a source of current, circuit connections providing two parallel circuits supplied with current from said source and each including a resistance at each of said points and an intermediate connecting portion, said connections being so arranged that the currents flow in opposite directions through said circuits between the resistances located at said separated points, a cross connection between the intermediate portions of said parallel circuits, a contact movable along said cross connection, a second contact movable along one of said intermediate circuit portions, electrical indicating means connected between said contacts, and a flow meter responsive to the quantity rate of fluid flow through said conduit and moving the first-mentioned contact along said cross connection in proportion to said rate of flow.

10. Means for determining the amount of heat lost or absorbed by a fluid in flowing between two separated points in a conduit, comprising in combination a source of current, circuit connections providing two parallel circuits supplied with current from said source and each including a resistance at each of said points and an intermediate connecting portion, said connections being so arranged that the currents flow in opposite directions through said circuits between the resistances located at said separated points, a cross connection between the intermediate portions of said parallel circuits, a contact movable along said cross connection, a second contact movable along one of said intermediate circuit portions, a flow meter responsive to the quantity rate of fluid flow through said conduit and moving the first-mentioned contact along said cross connection in proportion to said rate of flow and means responsive to the potential difference between said contacts for adjusting said second contact to minimize said potential difference.

GEORGE H. GIBSON.